Patented Aug. 7, 1934

1,969,477

UNITED STATES PATENT OFFICE 1,969,477

NITROCELLULOSE CEMENT

Adolph C. Rittman, Rochester, N. Y., assignor to Eastman Kodak Company, Rochester, N. Y., a corporation of New York No Drawing. Application May 16, 1932, Serial No. 611,644

7 Claims. (Cl. 87—17)

This invention relates to nitrocellulose cements. Its object is to provide a nitrocellulose cement which can be used for attaching nitrocellulose sheets to paper or cardboard. A cement for this purpose must have sufficient solvent action on the nitrocellulose sheet to soften it slightly, but not such a strong solvent action as to distort or disintegrate the nitrocellulose sheet. It is also desirable that the cement have a slight softening action on the paper or cardboard, particularly if the paper or cardboard has a hard surface.

I have discovered that a cement having the above-described properties, which attaches nitrocellulose sheets to paper or cardboard in a very satisfactory fashion, may be compounded by dissolving approximately 4.5 parts by weight of nitrocellulose and approximately 1 part by weight of a plasticizer for nitrocellulose in 100 parts by weight of a liquid mixture made up of approximately 40% of a solvent or solvents for nitrocellulose, approximately 55% of an organic non-solvent for nitrocellulose which is miscible with the solvents used, and approximately 5% of water.

As an example of carrying out my invention I give the following formula:

Solid components

| | Parts by weight |
|---|---|
| Nitrocellulose | 4.5 |
| Camphor | 1 |

Liquid components 100 parts by weight of a mixture made up as follows:

| | Per cent by weight |
|---|---|
| Acetone | 20 |
| Ethyl lactate | 20 |
| Xylene | 55 |
| Water | 5 |

The above example is given merely by way of illustration, and I am not to be limited thereby except as indicated in the appended claims. The proportion of nitrocellulose used may be varied somewhat according to the viscosity desired in the finished cement. The amount of camphor or other plasticizer used may vary between 10% and 50%, approximately, of the amount of nitrocellulose. The amount of water should be approximately the same as the amount of nitrocellulose, but should in no case be so great that it is not tolerated by the mixture of solvents and organic non-solvent used. I may use a single solvent, which may be either low-boiling or medium-boiling, but I prefer to use a mixture of low-boiling and medium-boiling solvents, for instance, a mixture of acetone and ethyl lactate. The amount of low-boiler may vary between 0% and 40%, approximately, of the total weight of liquid components, while the amount of medium-boiler may vary in the inverse direction between approximately 40% and 0% of the total weight of liquid components. In place of acetone I may use other low-boiling solvents; for instance I may use ethyl acetate or a mixture of ethyl acetate and acetone. In place of ethyl lactate I may use other medium-boiling solvents or mixtures of them, for instance, butyl acetate or amyl acetate. In place of xylene I may use other organic non-solvents, such, for instance, as benzene, toluene, or ethyl alcohol, or mixtures thereof. The proportions of the various components of the liquid mixture may be varied considerably, depending upon the properties desired in the finished cement, but should not be such that an amount of water approximately equal to the amount of nitrocellulose used will not be tolerated.

What I claim as my invention and desire to be secured by Letters Patent of the United States is:

1. A nitrocellulose cement comprising nitrocellulose, a plasticizer for nitrocellulose, a solvent for nitrocellulose, an organic non-solvent for nitrocellulose, and an amount of water approximately equal to the amount of nitrocellulose, the water being tolerated by the organic liquids.

2. A nitrocellulose cement comprising nitrocellulose, a plasticizer for nitrocellulose, a low-boiling solvent for nitrocellulose, a medium-boiling solvent for nitrocellulose, an organic non-solvent for nitrocellulose, and an amount of water approximately equal to the amount of nitrocellulose, the water being tolerated by the organic liquids.

3. A nitrocellulose cement comprising nitrocellulose, camphor, acetone, ethyl lactate, an organic non-solvent for nitrocellulose, and an amount of water approximately equal to the amount of nitrocellulose, the water being tolerated by the organic liquids.

4. A nitrocellulose cement comprising nitrocellulose, camphor, ethyl acetate, ethyl lactate, an organic non-solvent for nitrocellulose, and an amount of water approximately equal to the amount of nitrocellulose, the water being tolerated by the organic liquids.

5. A nitrocellulose cement comprising nitrocellulose, camphor, acetone, ethyl acetate, ethyl lactate, xylene, and an amount of water approximately equal to the amount of nitrocellulose, the water being tolerated by the organic liquids.

6. A nitrocellulose cement comprising nitrocellulose, camphor, acetone, ethyl acetate, ethyl lactate, ethyl alcohol, and an amount of water approximately equal to the amount of nitrocellulose, the water being tolerated by the organic liquids.

7. A nitrocellulose cement comprising approximately 4.5 parts by weight of nitrocellulose, approximately 1 part by weight of a plasticizer for nitrocellulose, and approximately 100 parts by weight of a liquid mixture comprising approximately 40% of a solvent or solvents for nitrocellulose, approximately 55% of an organic non-solvent or non-solvents for nitrocellulose, and approximately 5% of water, the water being tolerated by the organic liquids.

ADOLPH C. RITTMAN.